United States Patent [19]
Karay et al.

[11] Patent Number: 5,832,881
[45] Date of Patent: Nov. 10, 1998

[54] SUPPLEMENTARY PORT FOR TWO STROKE ENGINE

[75] Inventors: Stephen John Karay, Scarborough; Kenneth Phillip Seeber, Wanneroo, both of Australia

[73] Assignee: Orbital Engine Company (Australia) Pty Limited, Balcatta, Australia

[21] Appl. No.: 671,357

[22] Filed: Jun. 27, 1996

[30] Foreign Application Priority Data

Jun. 29, 1995 [AU] Australia ................................ PN 3877

[51] Int. Cl.⁶ ..................................................... F02D 43/00
[52] U.S. Cl. ......................................................... 123/65 PE
[58] Field of Search ................... 123/65 PE, 65 P

[56] References Cited

U.S. PATENT DOCUMENTS

| 4,121,552 | 10/1978 | Mithuo et al. | 123/65 PE |
|---|---|---|---|
| 4,909,193 | 3/1990 | Boyesen | 123/65 PE |
| 4,911,115 | 3/1990 | Boyesen | 123/65 PE |
| 5,183,013 | 2/1993 | Ito et al. | 123/65 PE |
| 5,190,006 | 3/1993 | Motoyama et al. | 123/65 PE |
| 5,373,816 | 12/1994 | Asai et al. | 123/65 PE |

FOREIGN PATENT DOCUMENTS

| 0 165 655 | 12/1985 | European Pat. Off. . | |
| 0 654 592 | 5/1995 | European Pat. Off. . | |
| 173816 | 7/1988 | Japan | 123/65 PE |
| 173817 | 7/1988 | Japan | 123/65 PE |

OTHER PUBLICATIONS

Patent Abstracts of Japan, M–607, p. 110, JP 62–35024.
Patent Abstracts of Japan, M–620, p. 162, JP 62–70616.
Patent Abstracts of Japan, M–671, p. 21, JP–62–206221.
International Publication No. WO 90/14612 published Nov. 29, 1990.

*Primary Examiner*—Marguerite McMahon
*Attorney, Agent, or Firm*—Nikaido, Marmelstein, Murray & Oram LLP

[57] ABSTRACT

A two stroke internal combustion engine having at least one cylinder (1) with exhaust port means (5), the engine further including at least one supplementary passage (9) in addition to the exhaust port means (5) for allowing gas flow from the cylinder (1), and control means (7) for controlling the gas flow through the supplementary passage (9) as a function of predetermined operating conditions of the engine wherein the control means allows at least substantially unimpeded gas flow therethrough during a compression stroke of the engine when the engine is at least at idle, low engine loads and/or engine speeds, and/or during engine start-up and at least substantially prevents gas flow therethrough when the engine is at higher engine loads and/or engine speeds.

29 Claims, 6 Drawing Sheets

SUPPLEMENTARY PORT FOR TWO STROKE ENGINE

The present invention relates generally to two stroke internal combustion engines.

In a typical two-stroke internal combustion engine, the transfer and exhaust ports provided in the walls of each cylinder of the engine are opened and closed by respective pistons disposed for reciprocation within each cylinder. At the start of the compression phase of a cylinder combustion cycle, the last port to be fully closed by the piston is normally the exhaust port. Just prior to closure of the exhaust port, the pressure within the cylinder will be strongly influenced by the pressure in the exhaust system which is normally open to atmospheric pressure at its discharge end. Therefore, for the sake of a simplified description (ignoring exhaust tuning effects etc), the pressure within the cylinder can be considered to be equal to atmospheric pressure at the point that the exhaust port is closed by the piston. This situation arises independently of the position of the intake air throttle of the engine. Thus whether the engine is at idle (i e: intake air throttle typically closed) or at full load (i e: intake air throttle typically fully open, i e: W.O.T.) the cylinder will be compressing approximately the same amount of gas during its compression stroke.

This can be distinguished from a four stroke engine wherein gas is inducted into the cylinder during the induction phase of a cylinder combustion cycle whilst the exhaust valve is closed. In such a case, the pressure of the gas within the cylinder will be influenced by the position of the intake throttle of the engine through which the gas must flow to the cylinder. For example, if the intake throttle is closed, the downward motion of the piston will create a vacuum in the cylinder. Thus, at the start of the compression stroke of the cylinder combustion cycle of a four stroke engine, the amount of gas to be compressed will depend on the amount of intake throttle opening.

Because of these differences, the compression work of a two stroke engine will normally be higher than that of a four stroke engine at idle and lower engine loads (i e: smaller intake throttle openings).

All reciprocating engines experience cyclic torque reversals as the crankshaft rotates because of the compression work expended by the engine. This results in a cyclic variation in the instantaneous output torque as a function of the crank angle. At high engine speeds, this is not normally noticeable. Indeed, because a two stroke engine provides twice the number of power impulses per cylinder per revolution as compared to a four stroke engine, the torque output of a two stroke engine is generally smoother than for a comparable four stoke engine at medium and high loads. However, at low loads and at idle when the engine speed is typically lower, the torque output of the two stroke engine can be rougher than for a comparable four stroke engine at the same load because of the higher compression work expended by the two stroke engine. This can result in greater cyclic torque reversals at idle in a two stroke engine. These high cyclic torque reversals can physically manifest themselves as an unacceptable rocking of the engine about its roll axis at idle.

An arrangement used in some two stroke marine outboard engines in response to the above condition is to provide a further piston controlled port in the cylinder wall above the exhaust port, this further port normally being referred to as a "decompression port". This decompression port is typically relatively narrow in width and allows a portion of the gases to escape from the cylinder after the other ports are closed during the compression stroke of the piston to thereby provide a reduced compression ratio therein. This reduction in the compression ratio is most pronounced at idle. At higher speeds, as the time for the transfer of gases within the cylinder decreases, the effects of the decompression port become less significant because of the significantly reduced flow of gas therethrough thereby reducing its effect on the compression ratio within the cylinder and hence of the engine. This is because of the higher throttling effect the decompression port has when gas velocities are higher and the reduced opening time thereof due to higher engine speeds. Nevertheless, this arrangement does adversely affect the performance of the engine at higher engine loads because the decompression port allows some gases to escape from the cylinder throughout the entire engine operating range.

It is therefore an object of the present invention to provide a two stroke engine having supplemental passage means to control gas flow from the cylinder of the engine.

With this in mind, according to one aspect of the present invention, there is provided a two stroke internal combustion engine having at least one cylinder with exhaust port means and an exhaust valve for controlling the timing of opening of the exhaust port means, the engine further including supplementary passage means in addition to the exhaust port means for allowing gas flow from the cylinder, the exhaust valve further controlling the gas flow through the supplementary passage means.

According to another aspect of the present invention, there is provided a two stroke internal combustion engine having at least one cylinder with exhaust port means, the engine further including supplementary passage means in addition to the exhaust port means for allowing gas flow from the cylinder, and control means for controlling the gas flow through the supplementary passage means as a function of predetermined operating conditions of the engine, wherein the control means controls the gas flow through the supplementary passage means during a compression stroke of the engine to allow gas flow therethrough at least at idle, low engine loads and/or engine speeds, and/or during engine start-up and prevents gas flow therethrough at higher engine loads and/or engine speeds.

The gas flow from the cylinder through the supplementary passage means at idle and low loads/speeds results in a lower compression ratio than would have been the case if no supplementary passage means was provided. This results in a reduced magnitude of the cyclic torque reversals at idle and low load as less compression work is expended by the engine thereby producing a smoother torque output and reducing the possibility of rocking of the engine at idle. In addition, a reduced starting torque is provided because of the lower compression ratio. Furthermore, at high engine loads, the performance of the engine is unaffected by the presence of the supplementary passage means as gas flow through the supplementary passage means is prevented.

In another preferred arrangement, the control means may also or alternatively selectively allow gas flow through the supplementary passage means for controlling knock within the cylinder. The gas flow may therefore, for example, be allowed to pass through the supplementary passage means at high engine loads to thereby control engine knock by limiting the maximum pressures attainable within the cylinder.

The engine cylinder may have associated therewith an exhaust valve for controlling the timing of opening of the exhaust port means of the cylinder, the exhaust valve typically progressively opening and closing the exhaust port means with changing engine load and/or speed. This exhaust valve may also be arranged to control the gas flow through the supplementary passage means. To this end, the exhaust valve may control the opening of the supplementary passage means such that there is at least substantially unimpeded flow of gas therethrough when the engine is at idle and at low engine loads and/or speeds, or during engine start-up, and such that gas flow through the supplementary passage means is at least substantially prevented at high engine loads and/or speeds.

The exhaust valve may be located in an exhaust cavity adjacent the exhaust port means and may be movable between a closed position for at least substantially fully closing the exhaust port means and an open position for at least substantially fully opening the exhaust port means. The exhaust valve means may typically be at or near the closed position when the engine is at idle and may typically move towards the open position with increasing engine load and/or speed.

The supplementary passage means may be located in the cylinder wall adjacent the exhaust port means, and at a position intermediate the cylinder head and the exhaust port means. Therefore, in the case of a vertically aligned cylinder, the supplementary passage would be located immediately above the exhaust port means. It is however also envisaged that the supplementary passage means be provided in the cylinder head.

The supplementary passage means may be in the form of a relatively narrow port separate from the exhaust port means. It is also envisaged that the supplementary passage means be in the form of a channel or slot communicating with and extending at least substantially perpendicular to the exhaust port means.

The supplementary passage means may extend between the engine cylinder and the exhaust cavity containing the exhaust valve. The exhaust valve may therefore directly control the gas flow therethrough, progressively opening and closing the supplementary passage means as it moves between the typical closed and opened positions thereof. It is to be noted that the exhaust valve typically does not operate on a cycle per cycle basis, but rather is positioned according to engine speed and/or load.

In one preferred arrangement, the exhaust valve may have a valve face having a width for at least substantially fully covering the exhaust port means while leaving the supplementary passage means at least substantially fully uncovered. Movement of the exhaust valve towards the open position thereof with increasing engine load will move the valve face across the exit of the supplementary passage means progressively closing the passage. In an alternative arrangement, a projection may be provided along an edge of the valve face for the purpose of covering the supplementary passage means. This projection may, for example, be in the form of a tongue extending in the direction of the opening movement of the exhaust valve.

In yet another arrangement, an opening may be provided within the face of the exhaust valve, the opening being at least substantially fully aligned with the supplementary passage means when the engine is at idle and the exhaust valve is at or near the closed position. The opening preferably moves out of alignment with the supplementary passage means as the exhaust valve moves towards the open position thereof with increasing engine load so that the valve face progressively closes the exit of the supplementary passage means at high engine loads. This valve opening may, for example, be in the shape of a circle or a slot or any other shape which closely matches the exhaust valve position with the desired degree of opening of the supplementary passage means.

In an alternative arrangement, the exhaust valve may indirectly control gas flow through the supplementary passage means, the displacement of the exhaust valve controlling a secondary valve means located to intersect the supplementary passage means to thereby control gas flow therethrough. The actuation of the secondary valve means may be electrically or mechanically linked to the exhaust valve or may operate independently of the exhaust valve.

Where the supplementary passage means per cylinder comprises more than one supplementary passage, each of the supplementary passages may be at different heights in the cylinder and be of different cross-sectional areas. Still further, it is envisaged that in a multi-cylinder engine configuration that not all of the cylinders are arranged to include a supplementary passage means.

The secondary valve means noted above may be used in conjunction with the exhaust valve or may be the sole means to control the gas flow though the supplementary passage means. In the latter arrangement, the secondary valve means could be operated on a cyclic basis to open the supplementary passage means during the compression phase of the cylinder cycle, and to close the supplementary passage means during the expansion phase thereof. This would therefore provide for lower compression ratios without the power losses suffered from exhausting gases too early in the combustion cycle. Alternatively, the secondary valve means may be closed during the compression phase of the engine cycle and opened on the power phase. This would be particularly advantageous in conditions of over-run cut wherein "engine braking" could be improved. The secondary valve means may be a solenoid actuated valve. Alternately, because in this arrangement the valve may operate on a cyclic basis, the valve may alternatively be cam actuated.

In regard to multi-cylinder engine configurations, it is typical that the exhaust valves associated with the exhaust port means of each cylinder thereof are actuated in unison. That is, the exhaust valves within such an engine configuration are typically arranged on the same shaft such that they typically always provide the same timing of opening for the exhaust port of each cylinder. Accordingly, in such a configuration, separate control of each supplementary passage means associated with an individual cylinder is normally not possible. Nonetheless, the present invention is deemed applicable for such typical systems as well as those that rely on different means to provide for individual actuation of the exhaust valves on a multi-cylinder engine. In this latter regard, the aforementioned independent secondary valve means may be arranged to provide such individual control of the supplementary passage means of each cylinder. For example, an individual electrically operated valve may be provided to control each cylinder's supplementary passage means independent of the exhaust valve of each corresponding cylinder.

In another arrangement, the supplementary passage means could be located away from the exhaust port means, for example, adjacent the transfer ports or in the cylinder head. This may be advantageous because of the high thermal load typically existing around the exhaust port means. Addition of a supplementary passage or port near the exhaust port means may also complicate the configuration of the cooling passages about the exhaust port means. Valve means such as the above noted secondary valve means may be used to control the gas flow through the supplementary passage means in this alternative arrangement.

The exhaust gases released through the supplementary passage means may be directed to a catalytic treatment means arranged within the engine exhaust system. Alternatively, the exhaust gases may be directed to the crankcase of the two stroke engine to recirculate exhaust gases through the engine. It is also envisaged that under certain engine conditions, the gas flowthrough the supplementary passage means could be delivered directly to another cylinder of the engine at the appropriate period in the operational cycle of that cylinder in the manner as described in the applicant's Australian patent application No. 67900/94.

The provision of the supplementary passage means may also assist in controlling engine "knock" or "detonation" by limiting the maximum pressures within the cylinder as noted above. In the applicant's Australian patent application No. 70630/94, there is disclosed a method of controlling knock by retarding the opening of the exhaust port means using the exhaust valve. The supplementary passage means of the present invention could act in cooperation with the exhaust valve by allowing gas flow therethrough when the exhaust valve partially closes the exhaust port means to thereby control knock by limiting the maximum pressures attainable in the cylinder during compression and hence combustion. Alternatively, the supplementary passage means can be controlled independently of the exhaust valve to control knock.

Another benefit is an improvement in the treatment of exhaust emissions. The exhaust gas temperature at idle will be higher because exhaust gases are released earlier through the supplementary passage means prior to being released through the exhaust port means. The gas released through the supplementary passage means will hence typically be at a higher temperature than the exhaust gas exiting the exhaust port means. The higher temperature of the exhaust gas will help to increase or maintain the operating temperature of any catalytic treatment means provided downstream of the engine.

Alternatively, an exhaust gas recirculation (EGR) path could be provided to direct the exhaust gases released through the supplementary passage means to the crankcase to further assist in the emission control of the engine. Such an EGR path could be located or pass proximate a cooling passage of the engine to assist in the cooling of any such recirculated gases.

According to another aspect of the present invention, there is provided a method of controlling a two stroke internal combustion engine having at least one cylinder with exhaust port means, the engine further including supplementary passage means in addition to the exhaust port means for allowing gas flow from the at least one cylinder, and control means for controlling the gas flow through the supplementary passage means as a function of predetermined operating conditions of the engine, the method including controlling the gas flow through the supplementary passage means during a compression stroke of the engine to allow at least substantially unimpeded gas flow therethrough at least at idle, low engine loads and/or engine speeds, and/or during engine start-up and at least substantially preventing gas flow therethrough at higher engine loads and/or engine speeds.

To facilitate an understanding of the present invention, reference is made to the accompanying drawings which illustrate a preferred embodiment of a two stroke engine according to the present invention. It is to be appreciated that this is only one preferred embodiment of the present invention and that alternative arrangements are also envisaged.

Figure 1:
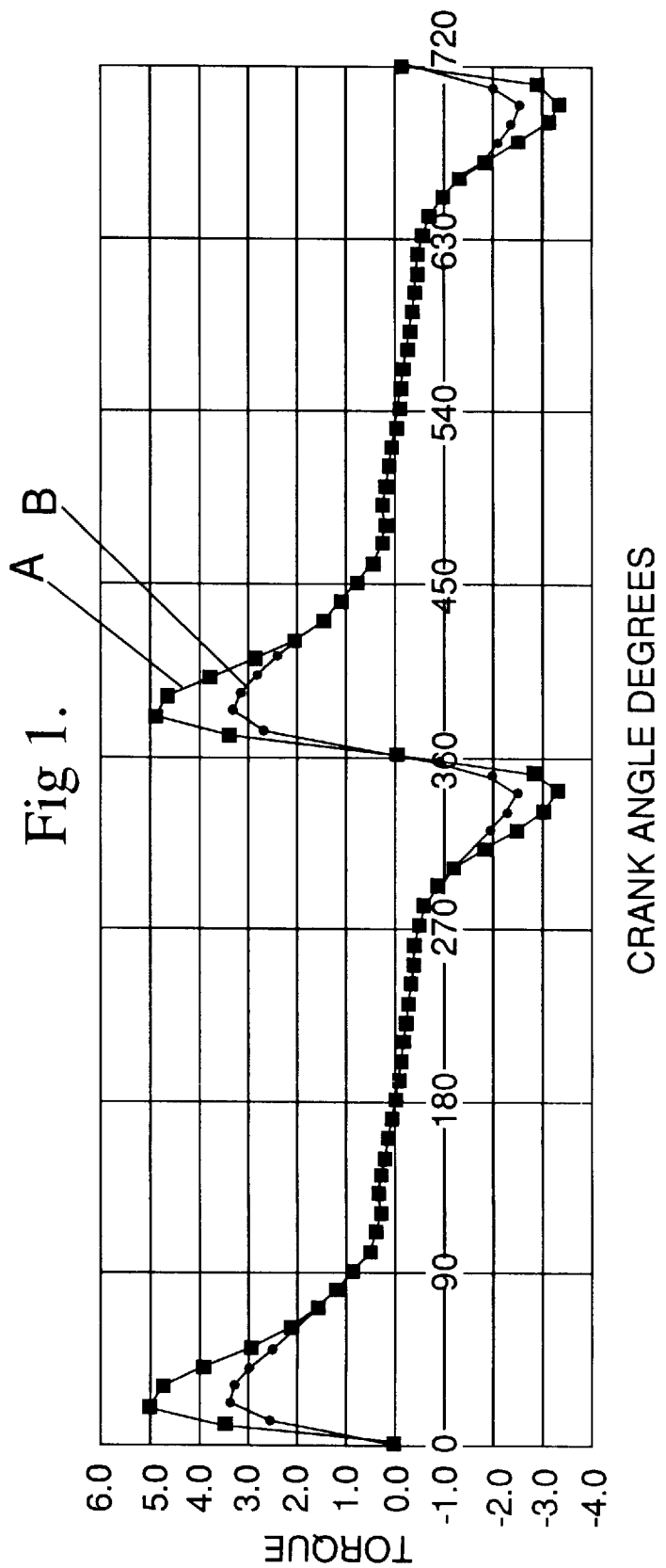
FIG. 1 is a graph having two plots showing the torque reversal for a ingle cylinder two stroke engine as a function of the crank angle without and with a supplementary port.
Figure 2:
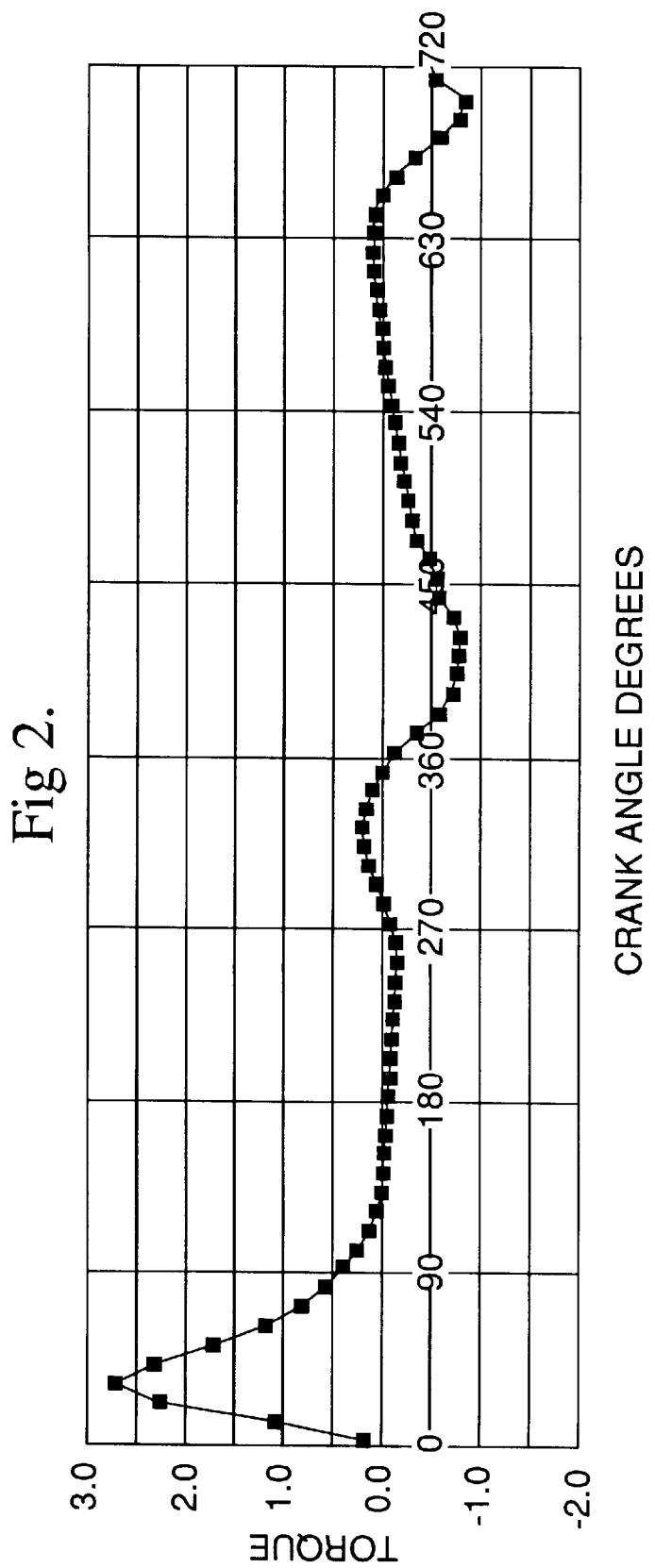
FIG. 2 is a graph showing the torque reversal as a function of the crank angle for a single cylinder four stroke engine of a similar torque output as the two stroke engine of FIG. 1.

The graphs of FIGS. 1 and 2 are indicative of the relative difference of the torque reversals for two and four stroke engines respectively. The scale for the torque output in each graph is therefore a relative scale with the corresponding numerical values of torque output in each graph being of the same magnitude.

FIG. 1 compares the relative magnitude of the torque reversals for a single cylinder two stroke engine which does not have a supplementary port (Plot A) with the same single cylinder two stroke engine having a supplementary port (Plot B), both operating at the same low engine load and speed. Each plot shows the instantaneous torque output of the engine as a function of the crank angle. At the points of maximum torque reversal shown in the graph, the torque reversal of the engine having the supplementary port is shown as being only about 70% of the torque reversal of the engine without the supplementary port. These plots clearly show that at low engine loads and/or speeds, the provision of a supplementary port significantly reduces the magnitude of the torque reversal in a two stroke engine.

FIG. 2 shows the instantaneous torque reversals as a function of crank angle for a single cylinder four stroke engine having the same torque output as the abovementioned two stroke engine and operating at the same low engine load and speed. It should be noted that the numerical extent of the scale for torque output of the graph of FIG. 2 is half that of the torque output scale for the graph of FIG. 1. This plot hence shows that the torque reversals for a four stroke engine at low engine load and speed are generally less extreme than for a two stroke engine of similar torque output operating at the same low engine load and speed.

Figure 3:
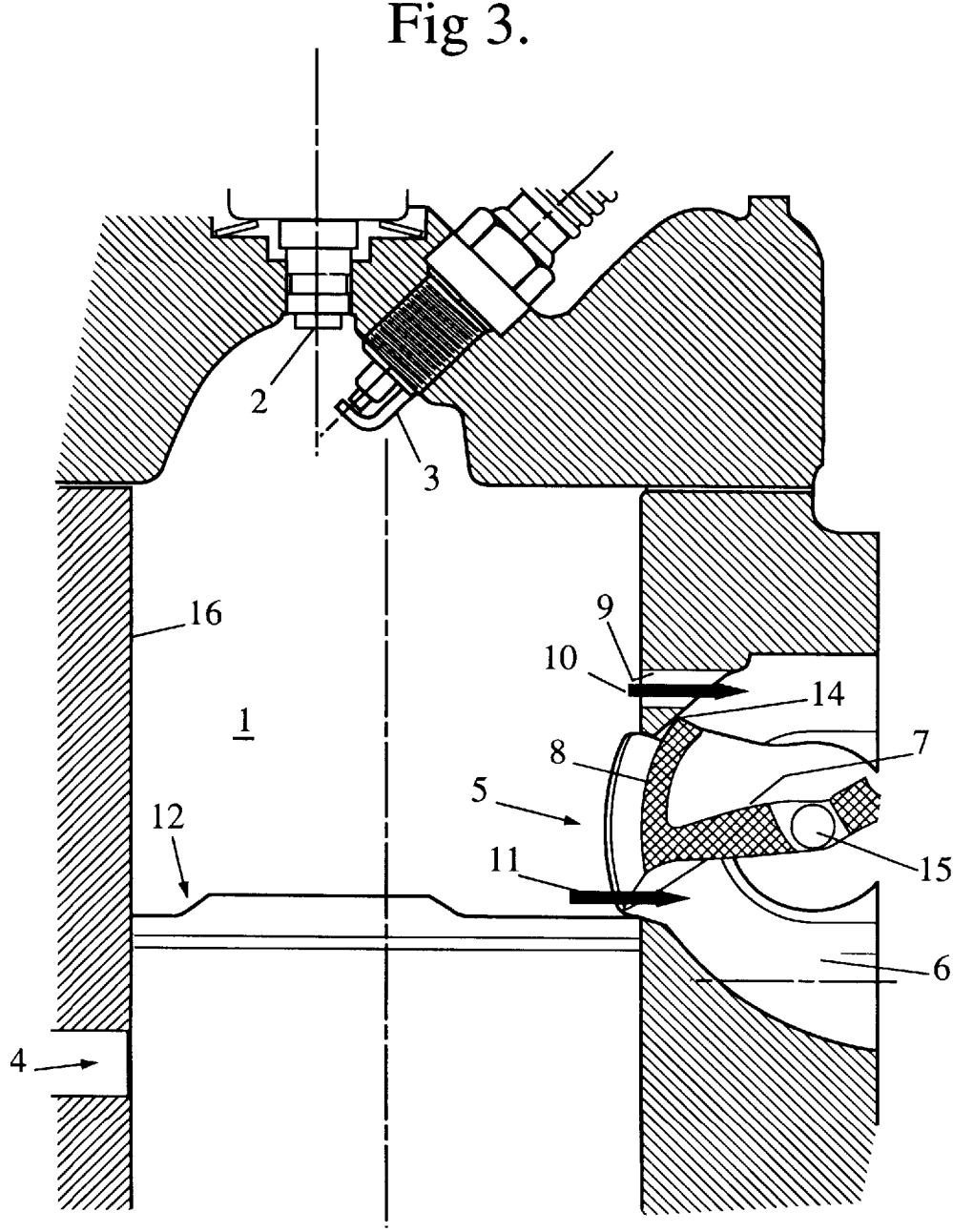
FIG. 3 is a partial cross-sectional view of a first embodiment of a cylinder of two stroke engine according to the present invention.

In FIG. 3, a cylinder 1 of a two stroke engine is shown including a fuel injector 2 and a spark plug 3. A transfer port 4 and an exhaust port 5 are provided in a cylinder wall 16, the opening and closing of these ports being controlled by the position of the piston 12. An exhaust valve 7 is located adjacent the exhaust port 5 within an exhaust cavity 6. This exhaust valve 7 is pivotally mounted about an axis 15 and movable between a closed position wherein the exhaust port 5 is at least substantially fully closed, and an open position wherein the exhaust port is at least substantially fully open. FIGS. 3 to 6 shows the engine at idle where the exhaust valve 7 almost completely closes the exhaust port 5.

Normally, exhaust gases 11 exit through the exhaust port 5 past the exhaust valve 7. The present invention however also provides at least one supplementary passage or port 9 which allows further exhaust gases 10 to escape into the exhaust cavity 6 when the engine is at or near idle when the exhaust port 5 is normally substantially closed. This results in a lower compression ratio within the cylinder 1 at or near idle.

With increasing engine load, the exhaust valve 7 moves upwards toward its open position (not shown) to thereby expose a greater area of the exhaust port 5 to gas flow. As the exhaust valve 7 moves towards its open position, the upper edge 14 of the valve face 8 of the exhaust valve 7 begins to progressively cover the exit of the supplementary passage 9. When the exhaust valve 7 is at or near its open position at high engine loads, the exit of the supplementary passage 9 is completely closed by the valve face 8. As there is no gas flow through the supplementary passage 9, the performance of the engine at high engine load is unaffected by the presence of the supplementary passage 9.

Alternative or additional means to selectively close the supplementary passage 9 are also envisaged. For example, a solenoid actuated valve may be provided to control the gas flow through the passage 9, the opening of the valve being controlled by an electronic control unit (ECU) monitoring the operational parameters of the engine. The solenoid valve may operate in conjunction with the exhaust valve 7 or may be the sole means of controlling the gas flow through the supplementary passage 9.

Figure 4:
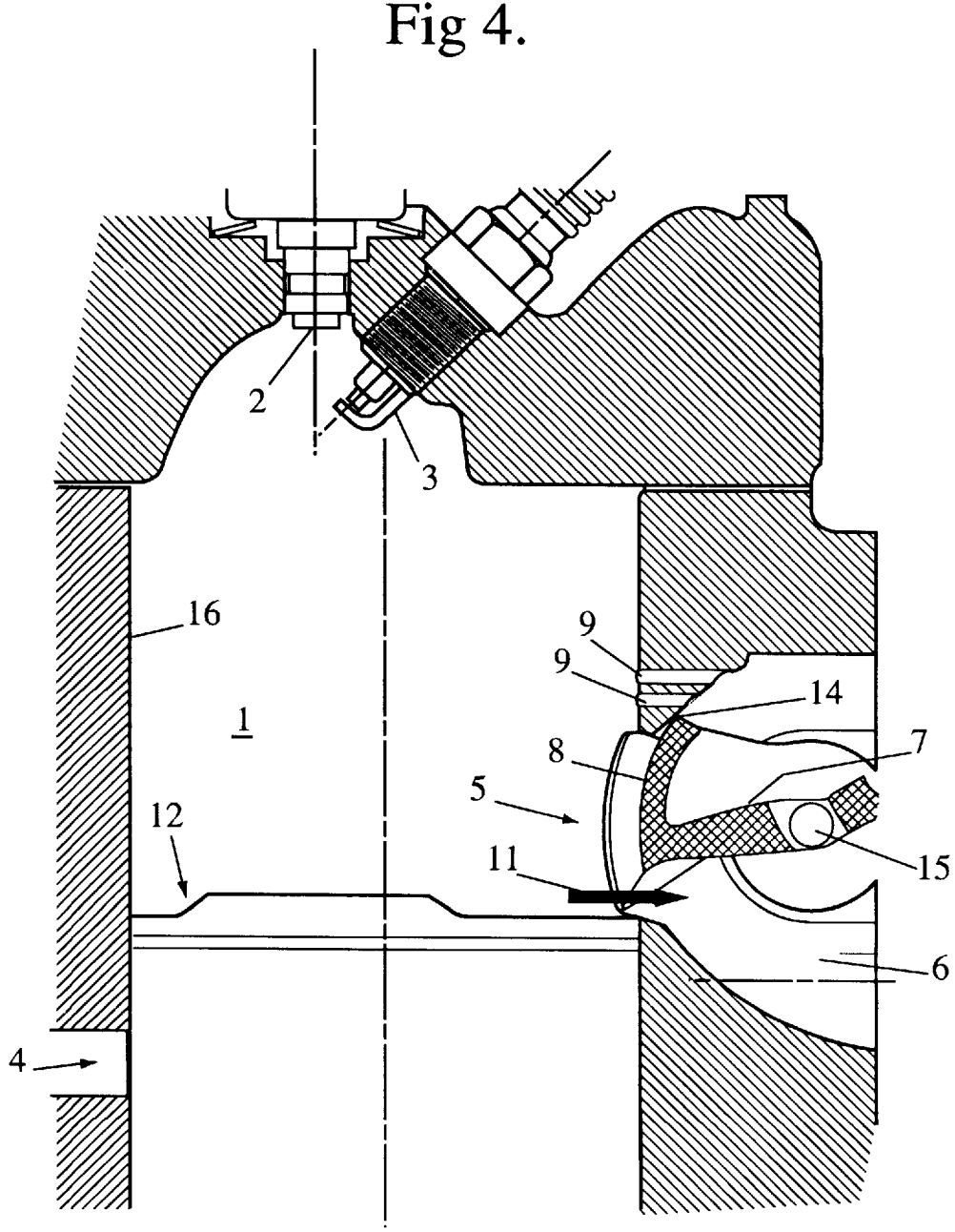
FIG. 4 is a partial cross-sectional view of a second embodiment of a cylinder of a two stroke engine according to the invention.
Figure 5:
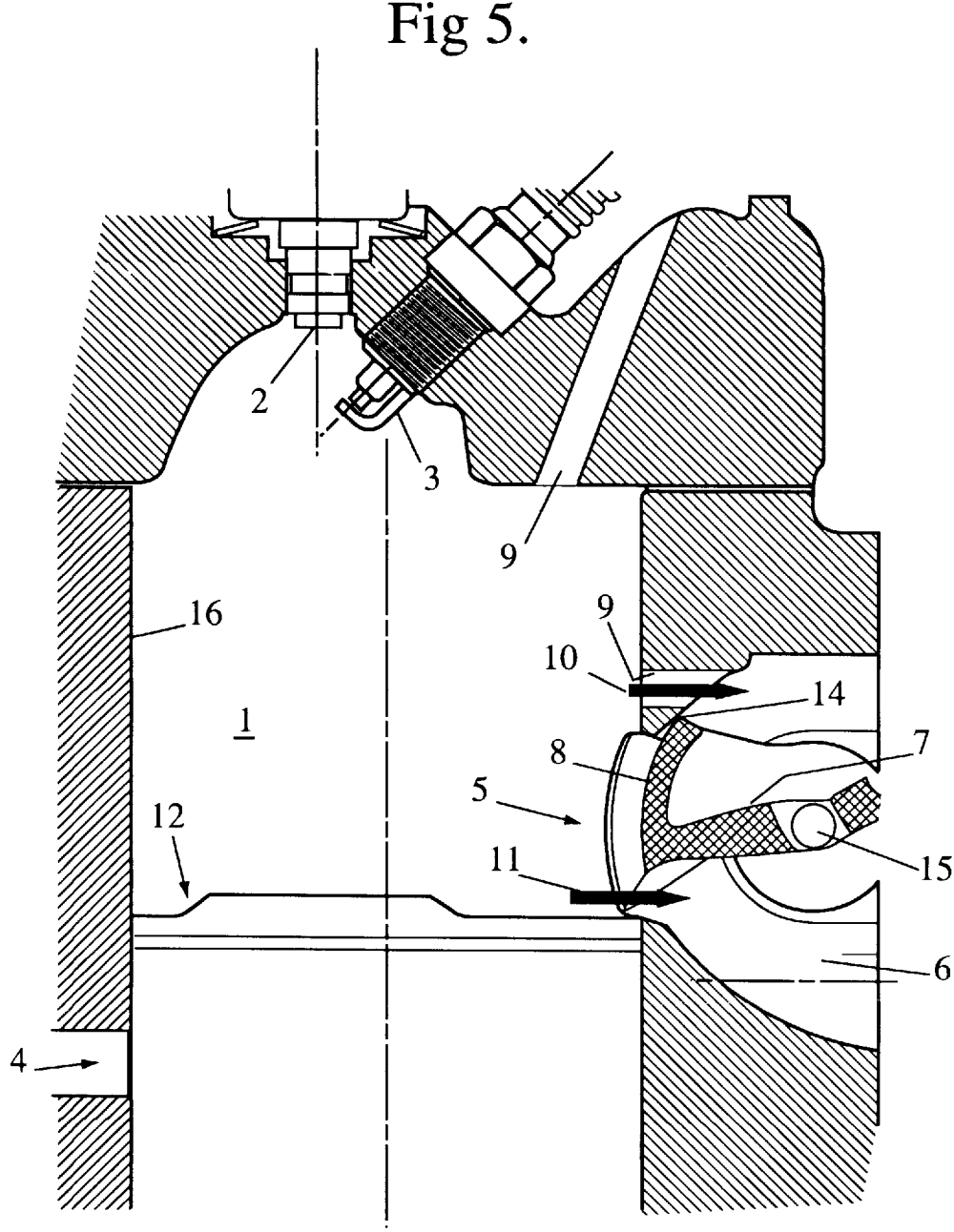
FIG. 5 is a partial cross-sectional view of a third embodiment of a cylinder of a two stroke engine according to the present invention.
Figure 6:
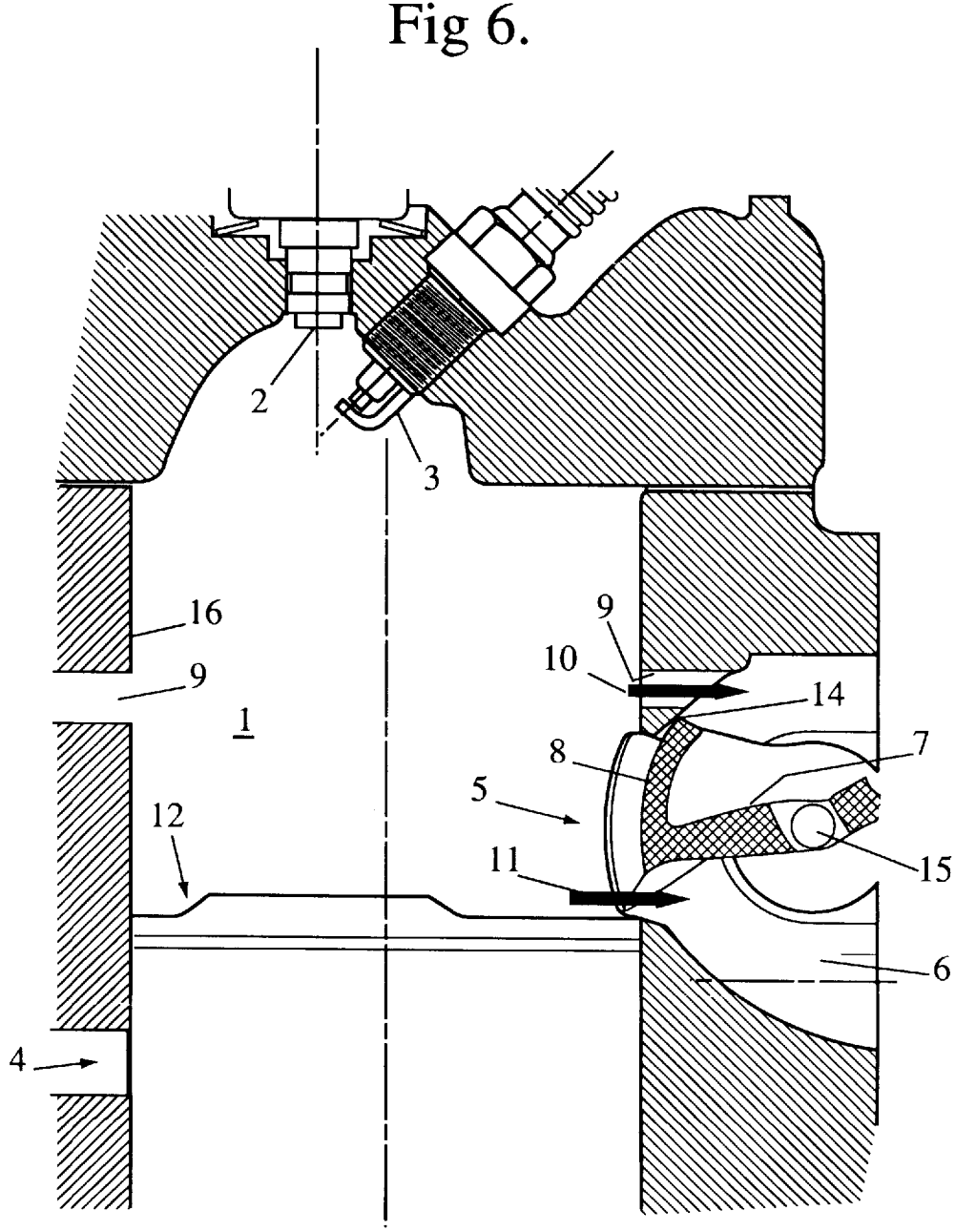
FIG. 6 is a partial cross-sectional view of a fourth embodiment of a cylinder of a two stroke engine according to the present invention.

The supplementary passage 9 may alternatively be located on the transfer port or inlet side of the cylinder 1 as shown in FIG. 6 or in the cylinder head as shown in FIG. 5. It is also envisaged that more than one supplementary passage 9 may be provided for each cylinder 1 as shown in FIG. 4.

We claim:

1. A two stroke internal combustion engine having at least one cylinder with exhaust port means, the engine further including supplementary passage means in addition to the exhaust port means for allowing gas flow from the cylinder, and control means for controlling the gas flow through the supplementary passage means as a function of predetermined operating conditions of the engine, wherein the control means controls the gas flow through the supplementary passage means during a compression stroke of the engine to allow gas flow therethrough at least at idle, low engine loads and/or engine speeds, and/or during engine start-up and prevents gas flow therethrough at higher engine loads and/or engine speeds.

2. An engine according to claim 1 wherein the at least one cylinder includes an exhaust valve for controlling the timing of opening of the exhaust port means, the exhaust valve further controlling the gas flow through the supplementary passage means.

3. An engine according to claim 1 wherein the supplementary passage means is in the form of a single supplementary passage for allowing gas flow from the at least one cylinder.

4. An engine according to claim 3 wherein the entrance of the supplementary passage is located in the wall of the cylinder adjacent the exhaust port means, and at a position intermediate a head of the cylinder and the exhaust port means.

5. An engine according to claim 3 wherein the supplementary passage is in the form of a relatively narrow port separate from the exhaust port means.

6. An engine according to claim 3 wherein the supplementary passage is in the form of a channel or slot communicating with and extending at least substantially parallel to the exhaust port means.

7. An engine according to claim 1 including a secondary valve means for controlling the gas flow through the supplementary passage means.

8. An engine according to claim 7 wherein the secondary valve means is operated on a cyclic basis to open the supplementary passage means during the compression phase of the cylinder cycle, and to close the supplementary passage means during the expansion phase thereof.

9. An engine according to claim 7 wherein the secondary valve means is closed during the compression phase of the engine cycle and opened on the power phase thereof.

10. An engine according to claim 1 wherein the supplementary passage means includes a plurality of supplementary passages for each cylinder, the entrances of each of the supplementary passages being located at different heights within the cylinder wall.

11. An engine according to claim 1 wherein the supplementary passage means includes a supplementary passage provided in a head of the cylinder.

12. An engine according to claim 1 wherein the supplementary passage means includes a supplementary passage located adjacent a transfer port means of the cylinder.

13. A two stroke internal combustion engine having at least one cylinder with exhaust port means and an exhaust valve for controlling the timing of opening of the exhaust port means, the engine further including supplementary passage means in addition to the exhaust port means for allowing gas flow from the cylinder, the exhaust valve further controlling the gas flow through the supplementary passage means.

14. An engine according to claim 13 wherein the exhaust valve controls the gas flow through the supplementary passage means during a compression stroke of the engine to allow gas flow therethrough at least at idle, low engine loads and/or speeds, and/or during engine start-up and prevents gas flow therethrough at higher engine loads and/or engine speeds.

15. An engine according to claim 13 wherein the exhaust valve is located in an exhaust cavity adjacent the exhaust port means and is movable between a closed position for at least substantially fully closing the exhaust port means and an open position for at least substantially fully opening the exhaust port means, the exhaust valve being at or near the closed position when the engine is at idle and moving towards the open position with increasing engine load and/or speed.

16. An engine according to claim 15 wherein the supplementary passage means extends between the engine cylinder and the exhaust cavity containing the exhaust valve.

17. An engine according to claims 13 wherein the exhaust valve includes a valve face having a width such that when the valve face is at least substantially fully covering the exhaust port means, the supplementary passage means remains at least substantially fully uncovered.

18. An engine according to claim 17 wherein a projection is provided along an edge of the valve face for selectively covering the supplementary passage means.

19. An engine according to claim 13 wherein the exhaust valve includes a valve face and an associated an opening therein, the opening being at least substantially fully aligned with the supplementary passage means when the engine is at idle and the exhaust valve is at or near the closed position.

20. An engine according to claim 19 wherein the opening moves out of alignment with the supplementary passage means as the exhaust valve moves towards the open position thereof with increasing engine load so that the valve face progressively closes the exit of the supplementary passage means at high engine loads.

21. An engine according to claim 13 wherein the displacement of the exhaust valve controls a secondary valve means located to intersect the supplementary passage means to thereby control gas flow therethrough.

22. An engine according to claim 21 wherein the actuation of the secondary valve means is electrically or mechanically linked to the exhaust valve.

23. An engine according to claim 13 wherein the exhaust valve selectively allows gas flow through the supplementary passage means at high engine loads to thereby control engine knock by limiting the maximum pressures attainable within the cylinder.

24. A method of controlling a two stroke internal combustion engine having at least one cylinder with exhaust port means, the engine further including supplementary passage means in addition to the exhaust port means for allowing gas flow from the at least one cylinder, and control means for controlling the gas flow through the supplementary passage means as a function of predetermined operating conditions of the engine, the method including controlling the gas flow through the supplementary passage means during a compression stroke of the engine to allow at least substantially unimpeded gas flow therethrough at least at idle, low engine loads and/or engine speeds, and/or during engine start-up and to at least substantially prevent gas flow therethrough at higher engine loads and/or engine speeds.

25. A method according to claim 24, the at least one cylinder including an exhaust valve for controlling the timing of opening of the exhaust port means of the at least one cylinder, the exhaust valve progressively opening and closing the exhaust port means with changing engine load and/or speed, the method including controlling the gas flow through the supplementary passage means by means of the exhaust valve.

26. A method according to claim 24 further including selectively allowing gas flow through the supplementary passage means for controlling knock within the cylinder at high engine loads by limiting the maximum pressures attainable within the at least one cylinder.

27. A method according to claim 24 wherein the supplementary passage means includes at least one supplementary passage for allowing gas flow from the at least one cylinder.

28. A method of controlling a two stroke internal combustion engine having at least one cylinder with exhaust port means and an exhaust valve for controlling the timing of opening of the exhaust port means, the engine further including supplementary passage means in addition to the exhaust port means for allowing gas flow from the cylinder, the method including controlling the gas flow through the supplementary passage means by way of the exhaust valve.

29. A method according to claim 28 further including controlling the gas flow through the supplementary passage means by way of the exhaust valve during a compression stroke of the engine to allow at least substantially unimpeded gas flow therethrough at least at idle, low engine loads and/or engine speeds, and/or during engine start-up and to at least substantially prevent gas flow therethrough at higher engine loads and/or engine speeds.

* * * * *

REEXAMINATION CERTIFICATE (4223rd)

United States Patent [19]
Karay et al.

[11] B1 5,832,881
[45] Certificate Issued Nov. 28, 2000

[54] SUPPLEMENTARY PORT FOR TWO STROKE ENGINE

[75] Inventors: Stephen John Karay, Scarborough; Kenneth Phillip Seeber, Wanneroo, both of Australia

[73] Assignee: Orbital Engine Company (Australia) Pty Limited, Balcatta, Australia

Reexamination Request:
No. 90/005,432, Aug. 9, 1999

Reexamination Certificate for:
Patent No.: 5,832,881
Issued: Nov. 10, 1998
Appl. No.: 08/671,357
Filed: Jun. 27, 1996

[30] Foreign Application Priority Data

Jun. 29, 1995 [AU] Australia ............................ PN 3877

[51] Int. Cl.$^7$ ............................................... F02D 43/00
[52] U.S. Cl. ......................................................... 123/65 PE
[58] Field of Search ............................... 123/65 PE, 65 P

[56] References Cited

U.S. PATENT DOCUMENTS

| | | | |
|---|---|---|---|
| 4,121,552 | 10/1978 | Mithuo et al. ........................ | 123/65 PE |
| 5,111,778 | 5/1992 | Huang . | |
| 5,373,816 | 12/1994 | Asai et al. ........................... | 123/65 PE |

FOREIGN PATENT DOCUMENTS

| | | |
|---|---|---|
| 0 603 914 | 6/1994 | European Pat. Off. . |
| 0 688 944 | 12/1995 | European Pat. Off. . |
| 2 280 711 | 2/1995 | United Kingdom . |

*Primary Examiner*—Marguerite McMahon

[57] ABSTRACT

A two stroke internal combustion engine having at least one cylinder (1) with exhaust port means (5), the engine further including at least one supplementary passage (9) in addition to the exhaust port means (5) for allowing gas flow from the cylinder (1), and control means (7) for controlling the gas flow through the supplementary passage (9) as a function of predetermined operating conditions of the engine wherein the control means allows at least substantially unimpeded gas flow therethrough during a compression stroke of the engine when the engine is at least at idle, low engine loads and/or engine speeds, and/or during engine start-up and at least substantially prevents gas flow therethrough when the engine is at higher engine loads and/or engine speeds.

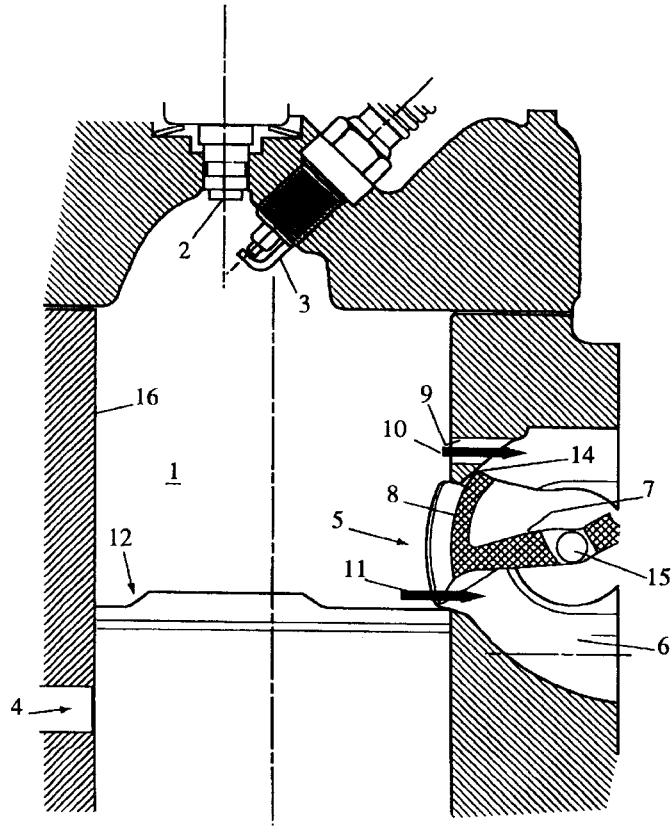

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 13–23 is confirmed.

Claims 2 and 25 are cancelled.

Claims 1 and 24 are determined to be patentable as amended.

Claims 3–12 and 26–29, dependent on an amended claim, are determined to be patentable.

1. A two stroke internal combustion engine having at least one cylinder with exhaust port means, the engine further including supplementary passage means in addition to the exhaust port means for allowing gas flow from the cylinder, and control means for controlling the gas flow through the supplementary passage means as a function of predetermined operating conditions of the engine, wherein the control means controls the gas flow through the supplementary passage means during a compression stroke of the engine to allow gas flow therethrough at least at idle, low engine loads and/or engine speeds, and/or during engine start-up and prevents gas flow therethrough at higher engine loads and/or engine speeds *wherein the at least one cylinder includes an exhaust valve for controlling the timing of opening of the exhaust port means, the exhaust valve further controlling the gas flow through the supplementary passage means*.

24. A method of controlling a two stroke internal combustion engine having at least one cylinder with exhaust port means, the engine further including supplementary passage means in addition to the exhaust port means for allowing gas flow from the at least one cylinder, and control means for controlling the gas flow through the supplementary passage means as a function of predetermined operating conditions of the engine, the method including controlling the gas flow through the supplementary passage means during a compression stroke of the engine to allow at least substantially unimpeded gas flow therethrough at least at idle, low engine loads and/or engine speeds, and/or during engine start-up and to at least substantially prevent gas flow therethrough at higher engine loads and/or engine speeds *wherein the at least one cylinder including an exhaust valve for controlling the timing of opening of the exhaust port means of the at least one cylinder, the exhaust valve progressively opening and closing the exhaust port means with changing engine load and/or speed, the method including controlling the gas flow through the supplementary passage means by means of the exhaust valve*.

* * * * *